(12) United States Patent
Kuroki

(10) Patent No.: US 6,358,480 B1
(45) Date of Patent: Mar. 19, 2002

(54) APPARATUS FOR DECOMPOSING WASTE PLASTICS

(76) Inventor: Takeshi Kuroki, 2-12-7, Aoshima, Miyazaki-shi, Miyazaki 889-2162 (JP)

( * ) Notice: Subject to any disclaimer, the term of this patent is extended or adjusted under 35 U.S.C. 154(b) by 0 days.

(21) Appl. No.: 09/341,342

(22) PCT Filed: Nov. 6, 1998

(86) PCT No.: PCT/JP98/05003

§ 371 Date: Jul. 8, 1999

§ 102(e) Date: Jul. 8, 1999

(87) PCT Pub. No.: WO99/24530

PCT Pub. Date: May 20, 1999

(30) Foreign Application Priority Data

Nov. 10, 1997 (JP) ............................................. 9-306954

(51) Int. Cl.⁷ ................................................. B09B 3/00
(52) U.S. Cl. ....................... 422/184.1; 48/123; 422/224; 422/225; 422/229; 422/232; 422/233; 422/234; 422/236
(58) Field of Search ......................... 48/123; 422/184.1, 422/224, 225, 226, 229, 232, 233, 234, 236, 238, 239

(56) References Cited

FOREIGN PATENT DOCUMENTS

| JP | 60-63543 U | * | 5/1985 |
| JP | 08151581 | * | 6/1996 |
| JP | 09013045 | * | 1/1997 |

* cited by examiner

Primary Examiner—Hien Tran
Assistant Examiner—Frederick Varcoe
(74) Attorney, Agent, or Firm—Bachman & LaPointe, P.C.

(57) ABSTRACT

There is provided a plastic waste decomposing apparatus which is capable of quickly and efficiently separating from a liquid phase polymer a vapor component produced from the liquid phase polymer so as to suppress generation of carbon following a decomposition reaction, and further capable of performing the decomposition reaction in the state where the temperature of the whole liquid phase polymer is uniform, so as to efficiently recover the vapor component of a desired molecular weight, so that decomposition of plastic waste can be carried out at a reasonable cost.

In the plastic waste decomposing apparatus, a decomposing chamber for heating the liquid phase polymer is in the form of an upright cylinder including therein a rotator having a shape substantially corresponding to a shape of an inner periphery of the decomposing chamber and a helical screw provided on an outer periphery of the rotator, so that the liquid phase polymer flowing down is subjected to thermal decomposition while being agitated to be forced upward by the screw in a reaction space formed between the inner periphery of the decomposing chamber and the outer periphery of the rotator.

9 Claims, 3 Drawing Sheets

APPARATUS FOR DECOMPOSING WASTE PLASTICS

TECHNICAL FIELD

The present invention relates to an apparatus for decomposing plastic waste so as to recover it as fuel oil, fuel gas or the like.

BACKGROUND ART

In recent years, how to perform the waste disposal has been a very important problem. In particular, plastic waste, when subjected to incineration, produces high temperatures to damage an incinerator so that the plastic waste is considered as waste whose disposal is difficult and a disposal method thereof has been sought. Most of the plastic waste, such as polyethylene or polystyrene, is formed into a liquid phase polymer through a thermal decomposition treatment and, when subjected to further thermal decomposition, it can be recovered as fuel oil or fuel gas. Since it is the best for the waste disposal to recover those useful things from the waste, the development of apparatuses has been expected which can recover fuel oil or fuel gas from the plastic waste at a reasonable cost.

Various researches relating to plastic waste decomposing apparatuses have been made from the foregoing aspect, and techniques of, for example, Laid-open Patent Publication No. 4-180878, Laid-open Patent Publication No. 5-237645, Laid-open Patent Publication No. 5-263079 and so on have been proposed.

However, the fact is that those techniques have not yet reached the real stage of practical use. This is because there have been the following problems peculiar to those techniques. Specifically, decomposition of plastic waste is carried out by heating a liquid phase polymer to destroy a high-order structure of the polymer into a low-order structure, further heating it to produce vapor components depending on decomposition temperatures, and cooling them to obtain fuel oil or fuel gas of various kinds. At this time, since it is difficult to quickly separate from the liquid phase polymer the vapor components of low molecular weight produced through decomposition of the liquid phase polymer, there is a case wherein the vapor components are excessively heated at contact portions with a heating wall surface so as to produce much carbon. Since the produced carbon covers the heating surface to function as a heat insulating material, it makes difficult a control upon carrying out decomposition of the liquid phase polymer, particularly a decomposition temperature control, and increases the cost of running the decomposing apparatus. Further, if the carbon is entrapped into the recovered oil, the oil quality is lowered. There is a further problem that due to difficulty in keeping uniform the temperature of the whole liquid phase polymer upon performing the decomposition reaction, it is difficult to control the degree of the liquid phase polymer decomposition so that difficulty is encountered in selectively obtaining a recovery of a desired composition.

Therefore, an object of the present invention is to provide a plastic waste decomposing apparatus which is capable of quickly and efficiently separating from a liquid phase polymer a vapor component produced from the liquid phase polymer so as to suppress generation of carbon following a decomposition reaction, and further capable of performing the decomposition reaction in the state where the temperature of the whole liquid phase polymer is uniform, so as to efficiently recover the vapor component of a desired molecular weight.

DISCLOSURE OF THE INVENTION

For solving the foregoing problems, a plastic waste decomposing apparatus according to the present invention is basically a plastic waste decomposing apparatus comprising a decomposing chamber which is supplied with a liquid phase polymer, obtained by heating plastic waste, from its upper side to its lower side, and which is heatable from exterior thereof, wherein the liquid phase polymer is subjected to thermal decomposition while being agitated in the decomposing chamber to produce a vapor component which becomes fuel oil or fuel gas. The decomposing chamber comprises an upright cylinder including therein a rotator having a shape substantially corresponding to a shape of an inner periphery of the decomposing chamber and a helical screw provided on an outer periphery of the rotator, so that the liquid phase polymer flowing down is subjected to the thermal decomposition while being agitated to be forced upward by the screw in a reaction space formed between the inner periphery of the decomposing chamber and the outer periphery of the rotator.

In the plastic waste decomposing apparatus of the present invention, the reaction space is formed between the inner periphery of the decomposing chamber and the outer periphery of the rotator by providing, in the decomposing chamber in the form of the upright cylinder, the rotator having the shape corresponding to the shape of the inner periphery of the decomposing chamber. Specifically, in the decomposing apparatus of the present invention, by forming narrow the reaction space where the decomposition reaction of the liquid phase polymer is carried out, it is possible to allow the whole of the liquid phase polymer to approach the inner periphery of the decomposing chamber where the polymer is heated, so that the heating thereof becomes uniform. Therefore, in the decomposing apparatus of the present invention, since the liquid phase polymer can be heated in the state where the temperature gradient thereof is as small as possible, the selective vapor component recovery and the carbon generation control are made possible.

Further, the helical screw is provided on the outer periphery of the rotator in the plastic waste decomposing apparatus so that the liquid phase polymer flowing down in the reaction space is agitated to be forced upward by the screw. By subjecting the liquid phase polymer to such agitation, the vapor component produced in the liquid phase polymer is forcibly raised to the liquid level of the liquid phase polymer so that gas-liquid separation is facilitated. Therefore, in the plastic waste decomposing apparatus, it can be prevented that the vapor component entrapped in the liquid phase polymer is overheated to produce carbon. Further, the foregoing agitation of the liquid phase polymer provides a sufficient time for reaction of the liquid phase polymer and allows the high-viscosity liquid phase polymer, which has not yet produced the vapor component, to stay in the reaction space preponderantly. Accordingly, the rate of the liquid phase polymer just before producing the vapor component can be increased in the reaction space so as to increase the decomposition reaction rate while preventing the carbon generation.

It is preferable that the rotator in the plastic waste decomposing apparatus of the present invention is provided with a cavity which can be supplied with high-temperature gas. With this arrangement, the liquid phase polymer can be heated from two surfaces forming the reaction space, i.e. from both the outer periphery of the rotator and the inner periphery of the decomposing chamber, so that the temperature gradient in the liquid phase polymer can be further reduced and, by supplying greater heat quantity, the plastic waste decomposition amount per unit time can be increased.

Further, in the plastic waste decomposing apparatus of the present invention, it is preferable that a lower part of the decomposing chamber is formed into a conical shape, and a circulation pipe is provided for circulating the liquid phase polymer, discharged from a lower end of the decomposing chamber, into the decomposing chamber. It is possible that impurities which can not be decomposed by heating are entrapped into the plastic waste. In this case, it is necessary to remove the residue produced in the process of the decomposition. By tapering the lower part of the decomposing chamber so as to form the inner periphery thereof to have the conical shape, the residue is naturally collected and accumulated at the lower end of the conical inner periphery so that the removing operation thereof can be easily carried out. The removal of the residue can be performed by providing a means for discharging the residue, for example, in the form of a screw conveyor within the circulation pipe, or a means for discharging the residue at the lower end of the conical lower part of the decomposing chamber. In either case, if the residue is once collected at the lower end of the decomposing chamber, the removal process is facilitated. The means for discharging the residue may be adequately provided depending on kinds of polymer, residue and the like. When removing the residue as described above, it is possible that the high-viscosity liquid phase polymer, which has sunk to the lower end of the decomposing chamber upon discharging the residue, also flows out from the decomposing chamber. In this case, by supplying again the high-viscosity liquid phase polymer, having flowed out from the lower part of the reaction chamber, to the decomposing chamber via the circulation pipe, a loss of the liquid phase polymer is prevented thereby to increase the vapor component amount to be recovered. Further, by the circulation of the liquid phase polymer, a staying time of the liquid phase polymer in the reaction chamber can be ensured.

BEST MODE FOR CARRYING OUT THE INVENTION

Hereinbelow, the first to third carrying-out modes of the plastic waste decomposing apparatuses according to the present invention will be described using the accompanying drawings. In the following description of the respective carrying-out modes, overlapping portions are assigned the same signs so as to omit redundant description.

First Carrying-Out Mode

Figure 1:
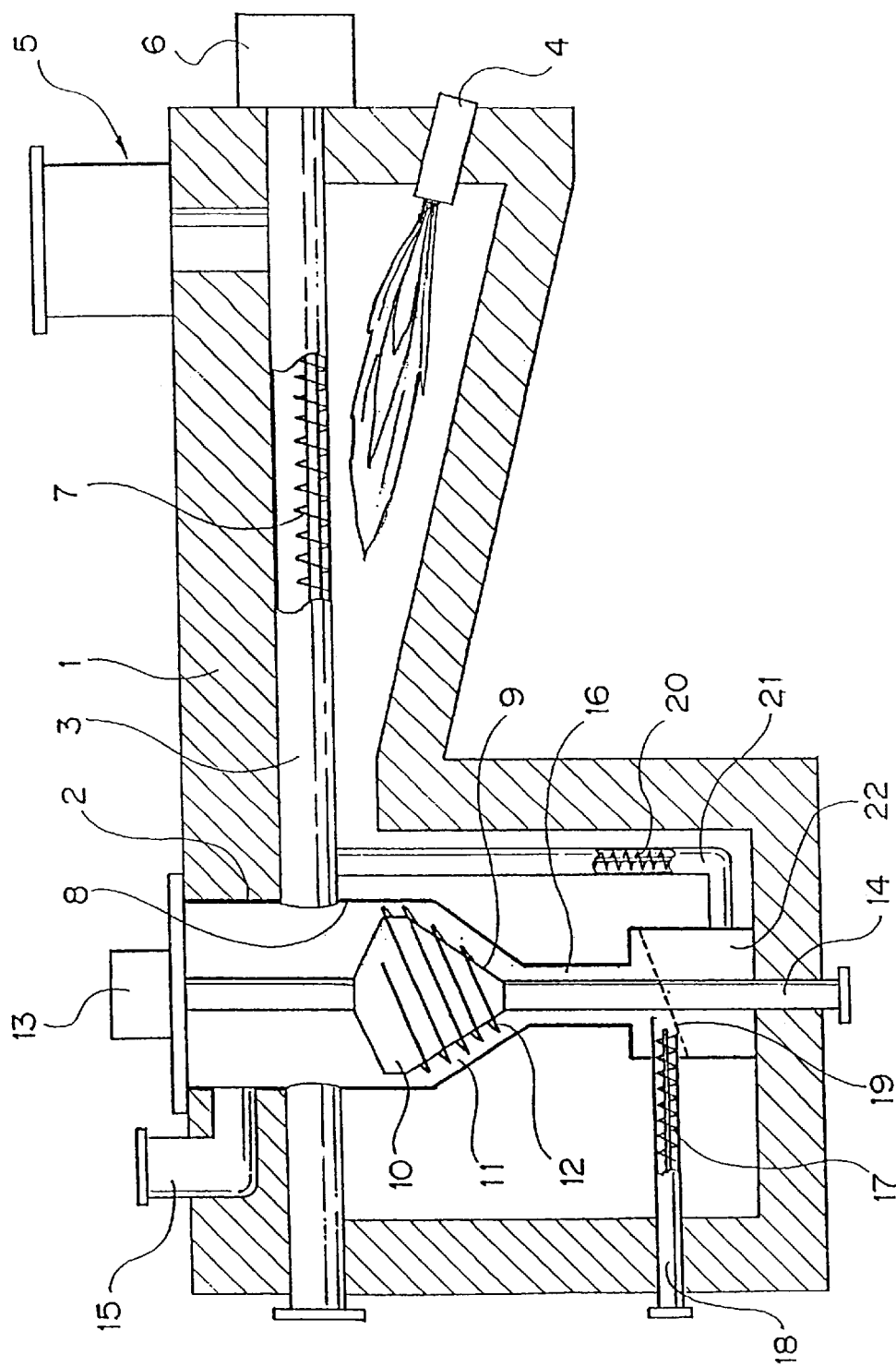
FIG. 1 is a conceptual diagram showing a plastic waste decomposing apparatus according to a first carrying-out mode of the present invention.

FIG. 1 shows the first carrying-out mode of the plastic waste decomposing apparatus according to the present invention.

The decomposing apparatus is provided with a decomposing chamber 2 and a supply pipe 3 which are surrounded by a casing 1 made of a heat insulating material and are connected to each other. In the casing 1 is provided a burner 4 which can heat the decomposing chamber 2 and the supply pipe 3.

The supply pipe 3 is connected at its one end to the decomposing chamber 2 and at its other end to a feed hopper 5. Further, the supply pipe 3 includes therein a carrying means 7 in the form of a screw conveyor connected to a driving means 6.

The decomposing chamber 2 is formed into the shape of a substantially upright cylinder and is tapered to have a conical shape at its lower part. The decomposing chamber 2 receives therein a rotator 10 having an outer periphery 9 corresponding to the shape of an inner periphery 8 of the decomposing chamber 2. Between the inner periphery 8 of the decomposing chamber 2 and the outer periphery 9 of the rotator 10, a narrow reaction space 11 is formed. The rotator 10 has a helical screw 12 on the outer periphery and is rotatable with a rotation shaft 14 connected to a driving means 13.

A vapor component outlet 15 is provided at an upper part of the decomposing chamber 2, and an outlet pipe 16 is connected to a lower end of the decomposing chamber 2. At a lower end of the outlet pipe 16 is provided a filter means 19 mounted on its upper surface with a residue discharge pipe 18 including therein a screw conveyor 17. And further below, a residue sump 22 is provided so as to be connected to the supply pipe via a circulation pipe 21 including therein a screw conveyor 20.

Now, an operation of the plastic waste decomposing apparatus will be described. Plastic waste to be decomposed by the apparatus is once stored in the feed hopper 5 and then introduced into the supply pipe 3 at the desired timing. The plastic waste introduced into the supply pipe 3 is transferred to the decomposing chamber 2 by the carrying means 7. Since the supply pipe 3 is heated from the exterior by means of the burner 4, the plastic waste is melted or partly decomposed during conveyance in the supply pipe 3 so as to become a liquid phase polymer.

The liquid phase polymer produced in the supply pipe 3 is fed to the decomposing chamber 2 and then flows down into the reaction space 11 therewithin. Since the hot air supplied by the burner also heats an outer wall of the decomposing chamber 2, the liquid phase polymer flowing down into the narrow reaction space 11 so as to be thin layers is decomposed into vapor components while being heated uniformly. The rotator 10 is rotated following the rotation of the rotation shaft 14 connected to the driving means 13. Therefore, the liquid phase polymer, while flowing downward, is given a force by the rotating screw 12 so as to be forced upward. As a result, the liquid phase polymer is decomposed into the vapor components while being agitated to be forced upward. The vapor components forcibly separated from the liquid phase polymer due to such agitation are discharged to the exterior via the vapor component outlet 15. The vapor components are cooled by a non-shown cooling apparatus and recovered at a room temperature as fuel oil or fuel gas. The molecular weight of the plastic waste is approximately 50,000 to 100,000, the molecular weight of the liquid phase polymer is approximately 10,000 to 30,000, and the molecular weight of the vapor component is approximately 100 to 500. The temperature inside the supply pipe for melting the plastic waste is 250 to 500° C., and the temperature of the reaction space for decomposing the liquid phase polymer is 350 to 600° C.

As the decomposition reaction of the liquid phase polymer progresses, the residue is produced in the reaction chamber 11. The residue is discharged through the outlet pipe 16 together with the liquid phase polymer whose viscosity is lowered due to reduction in molecular weight. Of the residue and liquid phase polymer discharged through the outlet pipe 16, the residue filtered out by the filter means 19 is accumulated on the surface of the filter means 19. On the other hand, the liquid phase polymer passing through the filter means 19 flows down into the residue sump 22. By accumulating the residue on the surface of the filter means 19 provided upstream of the residue sump 22 as described above, the accumulated residue can be used as filter layers for the liquid phase polymer discharged subsequently. If, however, the amount of the accumulated residue exceeds a given amount, the residue is removed to the exterior via the residue discharge pipe 18. At this time, the residue is compressed and solidified by the screw conveyor 17 within the residue discharge pipe 18. Since the solidified residue functions as a seal member for the decomposing chamber 2, the liquid phase polymer can be prevented from leaking via the residue discharge pipe 18. It may be arranged that not all the residue is removed via the residue discharge pipe 18, but solid matter or the like which is not decomposed by heat is separated utilizing a difference in specific gravity or the like and circulated via the circulation pipe 21. This is preferable because carbon and other adherends adhering to the wall surfaces in the reaction space 11 can be removed by means of the foregoing solid matter moving in the reaction space 11.

On the other hand, the liquid phase polymer collected in the residue sump 22 is circulated to the supply pipe 3 via the circulation pipe 21. This liquid phase polymer is fed to the decomposing chamber 2 again while being adjusted relative to a supply of the plastic waste, and decomposed into vapor components while repeating the foregoing circulation.

Second Carrying-Out Mode

Figure 2:
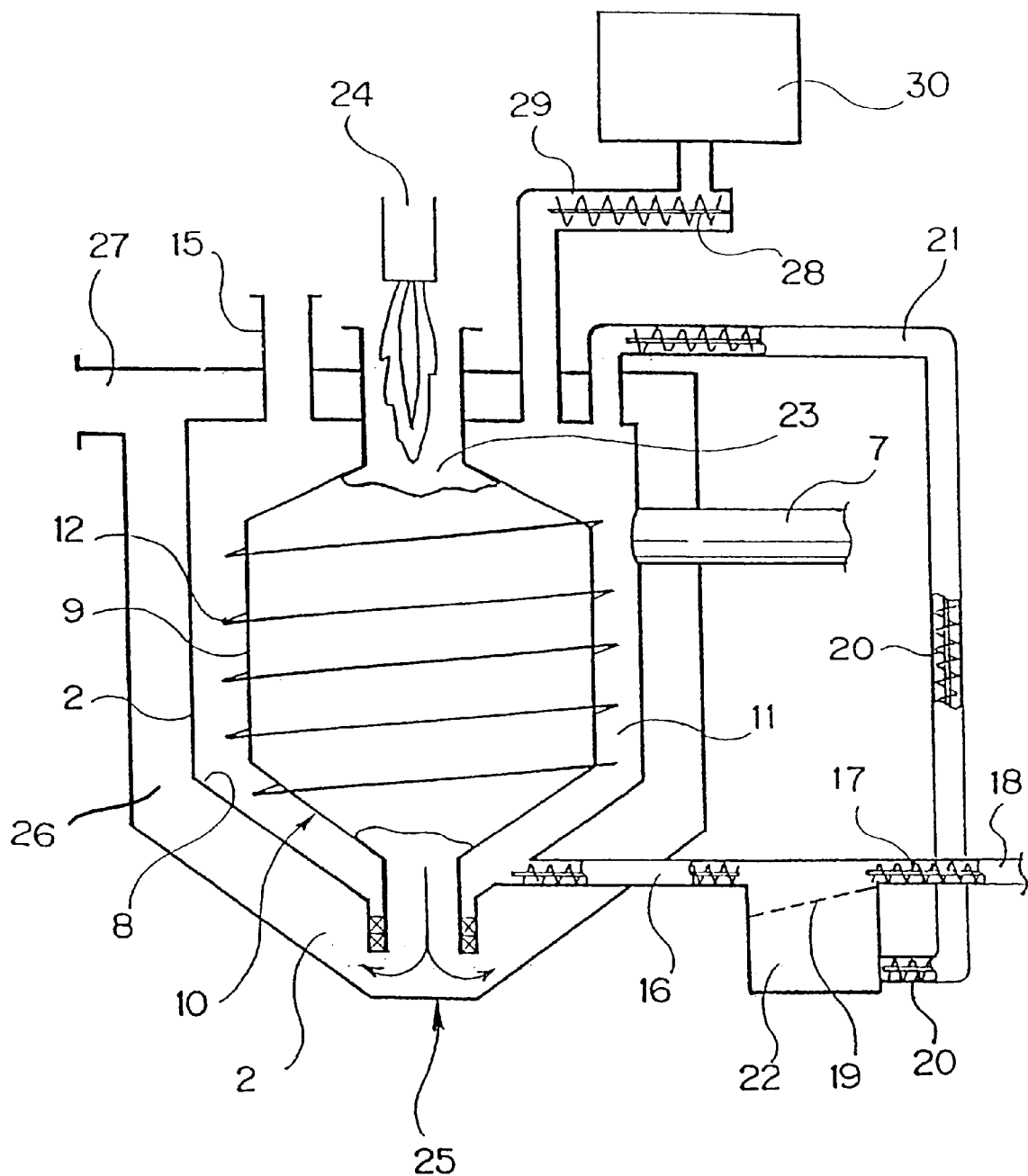
FIG. 2 is a conceptual diagram showing a decomposing chamber of a plastic waste decomposing apparatus according to a second carrying-out mode of the present invention.

FIG. 2 shows the second carrying-out mode of the plastic waste decomposing apparatus according to the present invention.

The plastic waste decomposing apparatus in this carrying-out mode basically has the same structure as that of the first carrying-out mode. However, the plastic waste decomposing apparatus in this carrying-out mode differs from that of the first carrying-out mode in structure of a decomposing chamber as follows. Specifically, the structure of the decomposing chamber is as shown in FIG. 2.

In the decomposing chamber 2 in this carrying-out mode, a cavity 23 is provided inside a rotator 10 disposed at the center of the decomposing chamber 2, and an auxiliary burner 24 which can heat the cavity 23 is provided over the rotator 10. Further, in this decomposing apparatus, an outer casing 25 is further provided outside the decomposing chamber 2 so as to form a heat passage 26, communicating with the cavity 23 inside the rotator 10, between the decomposing chamber 2 and the outer casing. An outlet 27 is provided above a reaction space 11 which is connected to a catalyst sump 30 via a catalyst feed pipe 29 including therein a screw conveyor 28. A horizontal outlet pipe 16 is provided at a lower portion of the decomposing chamber 2. The outlet pipe 16 connects between the reaction space 11 and a residue sump 22 provided outside the reaction space 11. A filter means 19 is provided at an upper side of the residue sump 22 which is connected to an upper portion of the decomposing chamber 2 via a circulation pipe 21. Further, the decomposing chamber 2 is connected at the lower portion thereof to a residue discharge means 18 including therein a screw conveyor 17.

Now, an operation of the apparatus will be described. When decomposing plastic waste using this apparatus, the plastic waste is first introduced into a supply pipe 3 as in the apparatus of the first carrying-out mode. The introduced plastic waste is heated by the burner 4 while being transferred in the supply pipe 3 by a carrying means 7, and melted to be a liquid phase polymer. The produced liquid phase polymer is fed to the decomposing chamber 2 and flows down into the reaction space 11.

The reaction space is heated from both inner and outer sides. thereof by the auxiliary burner 24. Specifically, the high-temperature hot air produced by the auxiliary burner 24 descends in the cavity 23 inside the rotator 10 to reach a lower end thereof, and then ascends in the heat passage 26 which is continuous with the cavity 23. Thus, the reaction space 11 is heated from both an outer periphery 9 of the rotator 10 and an inner periphery 8 of the decomposing chamber 2. In the reaction space 11 heated from both the inner and outer sides thereof, the liquid phase polymer is uniformly heated while being agitated to be forced upward by the screw 12, and decomposed while producing vapor components. Upon decomposing the liquid phase polymer, catalyst is supplied from the catalyst sump 30 into the reaction chamber via the catalyst feed pipe 29. By this catalyst supply, the liquid phase polymer in the reaction space is decomposed while contacting the catalyst. By utilizing such catalytic decomposition, the liquid phase polymer is decomposed more sufficiently. Then, the produced vapor components are discharged via a vapor component outlet 15, while the high-temperature hot air having reached an upper end of the heat passage 26 is discharged to the exterior via the foregoing outlet 27.

On the other hand, if the amount of the liquid phase polymer exceeds a given amount, an excess portion of the liquid phase polymer flows out via the outlet pipe 16 toward the residue sump 22. This flow-out liquid phase polymer, after the residue is removed by the filter means 19 provided at the upper side of the residue sump 22, is returned to the reaction space via the circulation pipe 21 at the given timing. In the foregoing manner, while the supply of the plastic waste and the circulation of the liquid phase polymer are carried out adequately, the plastic waste is decomposed into the vapor components. The residue is adequately discharged by the residue discharge means 18.

Third Carrying-Out Mode

Figure 3:
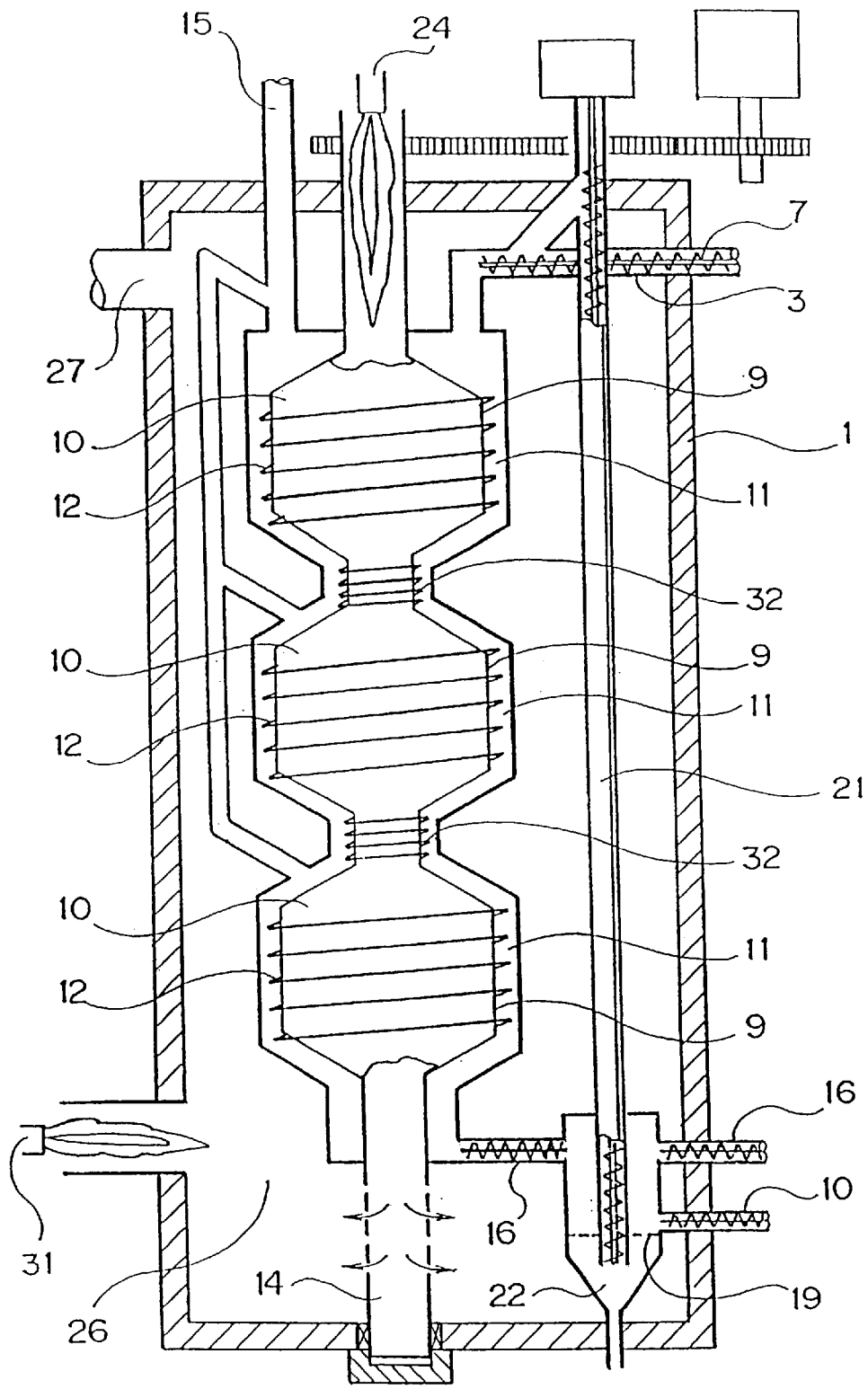
FIG. 3 is a conceptual diagram showing decomposing chambers of a plastic waste decomposing apparatus according to a third carrying-out mode of the present invention.

The plastic waste decomposing apparatus of the third carrying-out mode is provided with decomposing chambers 2 of the same kind as that of the second carrying-out mode. Specifically, it is provided with the decomposing chambers 2 wherein reaction spaces 11 can be heated from both outer peripheries 9 of rotators 10 and inner peripheries 8 of the decomposing chambers 2. FIG. 3 shows the decomposing chambers of the decomposing apparatus.

The decomposing chambers 2 of the plastic waste decomposing apparatus are provided therein with three rotators 10 each having a cavity 23 therein and coupled vertically to each other. The cavities 23 formed in the respective rotators 10 communicate with each other. The continuous cavities 23 communicate at a lower end thereof with a heat passage 26 provided outside the decomposing chambers 2. Between the inner peripheries 8 of the decomposing chambers 2 and the outer peripheries 9 of the rotators 10, the narrow reaction spaces 11 are formed. Over the uppermost rotator 10 is provided an auxiliary burner 24 which can heat the cavities 23 inside the rotators 10. Further, a second auxiliary burner 31 is provided outside the decomposing chambers 2 for ensuring a supply of sufficient heat quantity. A screw 12 is provided on the outer periphery of each rotator 10, while adjust screws 32 are provided at connecting portions between the adjacent rotators 10.

The reaction space 11 formed between the outer periphery 9 of the uppermost rotator 10 and the inner periphery 8 of the decomposing chamber 2 is connected to a supply pipe 3. A vapor component outlet 15 is provided for each of the reaction spaces 11. Further, the lowermost decomposing chamber 2 is connected at its lower end to a residue sump 22 via an outlet pipe 16. The residue sump 22 is connected to the supply pipe 3 via a circulation pipe 21 as well as to a residue discharge means 18.

Also in this apparatus, the reaction spaces 11 can be heated from both the outer peripheries 9 of the rotators 10 and the inner peripheries of the decomposing chambers 2. Further, in this apparatus, by adjusting the flow rate of the liquid phase polymer using the adjust screws 27, a sufficient time for decomposing the liquid phase polymer can be ensured. Even in an apparatus wherein the shape of an inner periphery 8 of a decomposing chamber 2 is formed cylindrical and a plurality of rotators 10 are disposed inside the decomposing chamber 2, the same effects as those in the foregoing apparatus can be achieved.

INDUSTRIAL APPLICABILITY

In a plastic waste decomposing apparatus according to the present invention, a rotator is provided in a decomposing chamber, and a layer-like reaction space is formed between an inner periphery of the decomposing chamber and an outer periphery of the rotator. Thus, heat conduction in a polymer becomes smooth so that a liquid phase polymer can be heated at a uniform temperature over the whole of it. Accordingly, a vapor component of a desired molecular weight can be selectively recovered, and a problem of carbon generation due to overheating which is caused depending on positions of the liquid phase polymer can be solved. Particularly, in case of providing a cavity inside the rotator and heating the reaction space from both the outer periphery of the rotator and the inner periphery of the decomposing chamber, the temperature gradient in the liquid phase polymer can be further diminished. Further, in the plastic waste decomposing apparatus according to the present invention, the liquid phase polymer flowing down is subjected to thermal decomposition while being agitated to be forced upward by a screw, so as to forcibly carry out gas-liquid separation. Thus, overheating of the vapor component in the liquid phase polymer can be almost avoided so that the problem of the carbon generation can be almost solved in cooperation with the foregoing uniform heating of the liquid phase polymer. Further, in case of forming a lower part of the decomposing chamber to have a conical shape and circulating the liquid phase polymer by providing a circulation pipe which circulates the liquid phase polymer, discharged from a lower end of the decomposing chamber, into the decomposing chamber, there can be obtained merits that the produced residue can be easily disposed of and that the decomposition efficiency can be improved.

What is claimed is:

1. A plastic waste decomposing apparatus comprising:
   a decomposing chamber supplied with a liquid phase polymer obtained by heating plastic waste, said decomposing chamber being heatable from exterior thereof;
   a rotator rotatably provided in the decomposing chamber and having a shape substantially corresponding to a shape of an inner periphery of the decomposing chamber to form a reaction space between an outer periphery of the rotator and the inner periphery of the decomposing chamber wherein the rotator is provided with a cavity which can be supplied with high-temperature gas, said reaction space being formed so that the liquid phase polymer supplied into the decomposing chamber flows down in the reaction space in the form of layers;
   an outer casing provided outside the decomposing chamber to form a heat passage between the decomposing chamber and the outer casing, wherein said cavity communicates at its lower end with said heat passage to introduce said high-temperature gas into the heat passage, so that said reaction space is heated from both the outer periphery of the rotator and the inner periphery of the decomposing chamber; and
   a helical screw provided on the outer periphery of the rotator,
   whereby the liquid phase polymer flowing down in the reaction space is subjected to thermal decomposition while being agitated to be forced upward by the rotating helical screw, to produce a vapor component.

2. A plastic waste decomposing apparatus as recited in claim 1, wherein a lower part of the decomposing chamber is formed into a conical shape, and a circulation pipe is provided for circulating the liquid phase polymer, discharged from a lower end of the decomposing chamber, into the decomposing chamber.

3. A plastic waste decomposing apparatus according to claim 1, further comprising at least a second decomposing chamber vertically communicating with the aforementioned decomposing chamber, wherein said second decomposing chamber is provided therein with a second rotator to form a second reaction space between an outer periphery of the second rotator and an inner periphery of the second decomposing chamber, said second reaction space communicating with the aforementioned reaction space, and wherein said second rotator is provided with a second cavity communicating at its upper end with the lower end of the aforementioned cavity and communicating at its lower end with said heat passage to introduce said high-temperature gas into the heat passage via the aforementioned cavity and the second cavity.

4. A plastic waste decomposing apparatus comprising:
   a decomposing chamber supplied with a liquid phase polymer obtaining by heating plastic waste, said decomposing chamber being heatable from exterior thereof;
   a rotator rotatably provided in the decomposing chamber and having a shape substantially corresponding to a shape of an inner periphery of the decomposing chamber to form a reaction space between an outer periphery of the rotator and the inner periphery of the decomposing chamber wherein the rotator is provided with a cavity which can be supplied with high-temperature gas, said reaction space providing a layer-like annular passage for the liquid phase polymer supplied into the decomposing chamber;
   an outer casing provided outside the decomposing chamber to form a heat passage between the decomposing chamber and the outer casing, wherein said cavity communicates at its lower end with said heat passage to introduce said high-temperature gas into the heat passage, so that said reaction space is heated from both the outer periphery of the rotator and the inner periphery of the decomposing chamber; and
   a helical screw provided on the outer periphery of the rotator,
   whereby the liquid phase polymer flowing down in the reaction space is subjected to thermal decomposition while being agitated to be forced upward by the rotating helical screw, to produce a vapor component.

5. A plastic waste decomposing apparatus as recited in claim 4, wherein a lower part of the decomposing chamber is formed into a conical shape, and a circulation pipe is provided for circulating the liquid phase polymer, discharged from a lower end of the decomposing chamber, into the decomposing chamber.

6. A plastic waste decomposing apparatus according to claim 4, further comprising at least a second decomposing chamber vertically communicating with the aforementioned decomposing chamber, wherein said second decomposing chamber is provided therein with a second rotator to form a second reaction space between an outer periphery of the second rotator and an inner periphery of the second decomposing chamber, said second reaction space communicating with the aforementioned reaction space, and wherein said second rotator is provided with a second cavity communicating at its upper end with the lower end of the aforementioned cavity and communicating at its lower end with said heat passage to introduce said high-temperature gas into the heat passage via the aforementioned cavity and the second cavity.

7. A plastic waste decomposing apparatus comprising:
   a decomposing chamber supplied with a liquid phase polymer obtained by heating plastic waste, said decomposing chamber being heatable from exterior thereof;
   a rotator rotatably provided in the decomposing chamber and having a shape substantially corresponding to a shape of an inner periphery of the decomposing chamber to form a reaction space between an outer periphery of the rotator and the inner periphery of the decomposing chamber wherein the rotator is provided with a cavity which can be supplied with high-temperature gas, said reaction space being formed so that the liquid phase polymer flowing in the reaction space is heated essentially at a uniform temperature over the whole of it;
   an outer casing provided outside the decomposing chamber to form a heat passage between the decomposing chamber and the outer casing, wherein said cavity communicates at its lower end with said heat passage to introduce said high-temperature gas into the heat passage, so that said reaction space is heated from both the outer periphery of the rotator and the inner periphery of the decomposing chamber; and
   a helical screw provided on the outer periphery of the rotator,
   whereby the liquid phase polymer flowing down in the reaction space is subjected to thermal decomposition while being agitated to be forced upward by the rotating helical screw, to produce a vapor component.

8. A plastic waste decomposing apparatus as recited in claim 7, wherein a lower part of the decomposing chamber is formed into a conical shape, and a circulation pipe is provided for circulating the liquid phase polymer, discharged from a lower end of the decomposing chamber, into the decomposing chamber.

9. A plastic waste decomposing apparatus according to claim 7, further comprising at least a second decomposing chamber vertically communicating with the aforementioned decomposing chamber, wherein said second decomposing chamber is provided therein with a second rotator to form a second reaction space between an outer periphery of the second rotator and an inner periphery of the second decomposing chamber, said second reaction space communicating with the aforementioned reaction space, and wherein said second rotator is provided with a second cavity communicating at its upper end with the lower end of the aforementioned cavity and communicating at its lower end with said heat passage to introduce said high-temperature gas into the heat passage via the aforementioned cavity and the second cavity.

* * * * *